(12) United States Patent
Ivanov et al.

(10) Patent No.: US 6,324,832 B1
(45) Date of Patent: Dec. 4, 2001

(54) AMPOULE WITH STARTING FUEL FOR IGNITING LRE PROPELLANT COMPONENTS

(75) Inventors: Jury Jurievich Ivanov, Khimki; Boris Dmitrievich Rozanov, Moscow; Felix Jurievich Chelkis, Khimki; Alexandr Anatolievich Tjurin, Khimki; Valentin Georgievich Polushin, Khimki; Alexandr Antonovich Baboshin, Khimki; Inna Alexandrovna Kolosova, Khimki, all of (RU)

(73) Assignee: Otkrytoe Aktsionernoe Obschestvo, Khimki (RU)

( * ) Notice: Subject to any disclaimer, the term of this patent is extended or adjusted under 35 U.S.C. 154(b) by 0 days.

(21) Appl. No.: 09/392,067

(22) Filed: Sep. 8, 1999

(30) Foreign Application Priority Data

Mar. 1, 1999 (RU) ................................. 99103735

(51) Int. Cl.$^7$ ..................................................... F02K 9/00
(52) U.S. Cl. ........................ 60/257; 60/39.141; 60/39.825
(58) Field of Search ................................ 60/39.141, 734, 60/257, 258, 259, 39.825, 39.821; 102/202

(56) References Cited

U.S. PATENT DOCUMENTS

| | | | |
|---|---|---|---|
| 3,704,807 | 12/1972 | Ligard | 220/89 A |
| 4,258,546 | * 3/1981 | Stratton | 60/259 |
| 4,312,954 | * 1/1982 | Black | 141/329 |
| 4,776,560 | * 10/1988 | Rowland et al. | 251/31 |
| 5,548,959 | * 8/1996 | Lechevalier | 60/734 |

FOREIGN PATENT DOCUMENTS 1138885   1/1969  (GB).

OTHER PUBLICATIONS

G. Gakhun, "Liquid–Propellant Rocket Engine Design and Engineering", textbook, Institutes of Higher Education, Moscow, "Mashinostroyeniye" 1989, p. 75, Fig. 4–5.

* cited by examiner

Primary Examiner—Charles G. Freay
Assistant Examiner—W. Rodriguez
(74) Attorney, Agent, or Firm—Christie, Parker & Hale, LLP

(57) ABSTRACT

The invention relates to the field of automatic equipment and, in particular, to devices for chemical ignition of liquid rocket engine propellant components. The ampoule comprises a body, diaphragm units mounted at the body inlet and outlet, each of which is made as a piston made as a single part with a diaphragm. The peripheral part of the diaphragm is fixed in an air-tight manner to the body under a guide element in which the body is mounted. The piston has a stem extending into a guide bush. Furthermore, a device for filling the ampoule with fuel is located in a partition of the body inside the ampoule. A guaranteed cutting of the diaphragm along the entire perimeter and reproduction of hydraulic characteristics for the flow part of the ampoule are achieved in this ampoule design.

29 Claims, 1 Drawing Sheet

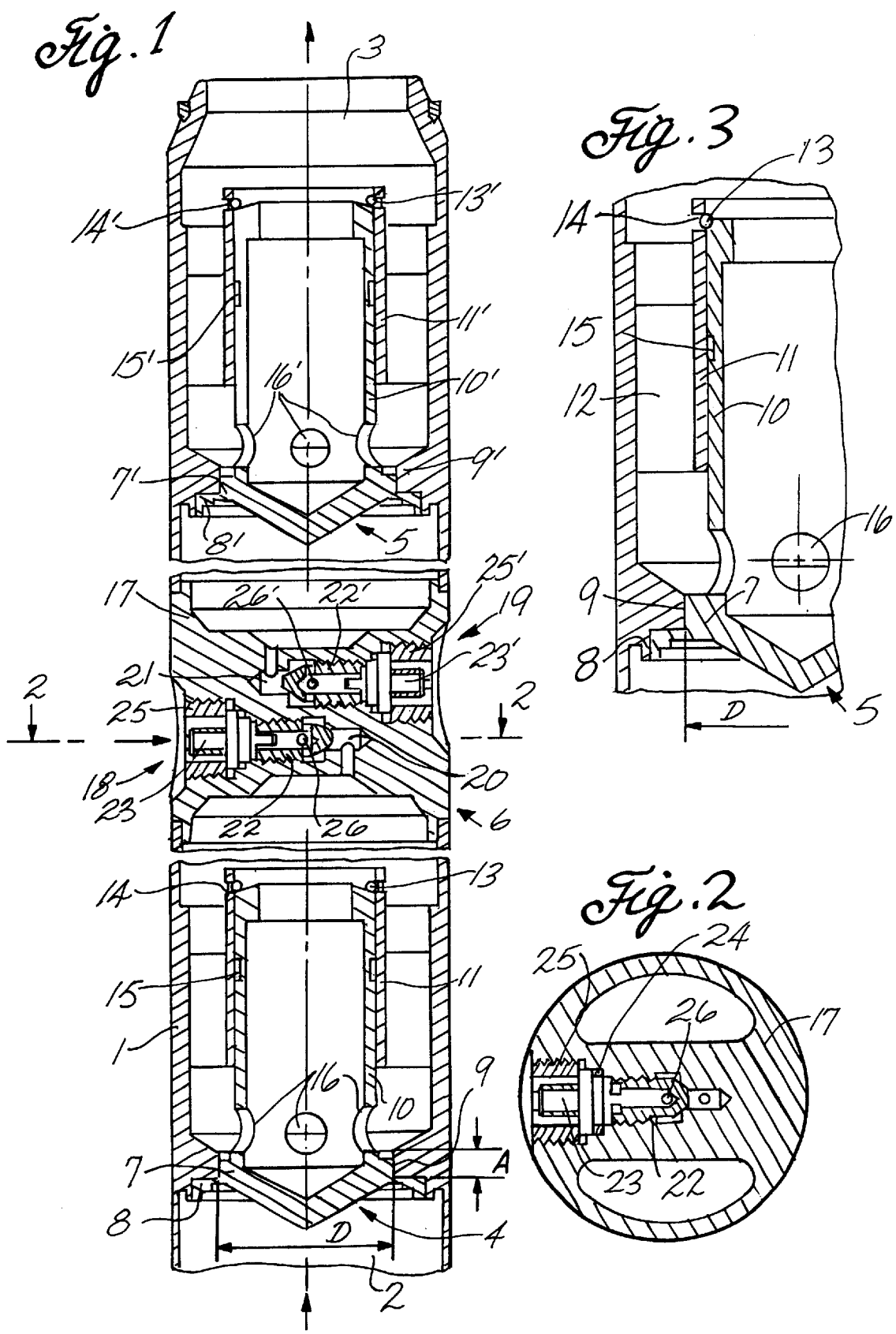

AMPOULE WITH STARTING FUEL FOR IGNITING LRE PROPELLANT COMPONENTS

FIELD OF THE INVENTION

The invention relates to the field of automatic equipment and, in particular, to ampoules with starting fuel to be mounted in the main line of one of the propellant components at the inlet to the mixing head of a combustion chamber or a gas generator for the chemical ignition of propellant components.

BACKGROUND OF THE INVENTION

Technical solutions are known in which safety and starting valves with rupturable diaphragms are used (U.S. Pat. No. 3,704,807, NPC 220-89, published 1972 or GB patent application No. 1138885, NPC F2V, published 1969). In these technical solutions the diaphragm breaks under the effect of pressure of the medium. These constructions do not provide the possibility of ensuring a constant flow section for the medium when the diaphragm breaks.

An ampoule with starting fuel for igniting the propellant components of liquid-propellant rocket engines (LRE) is known that comprises a body with an inlet and an outlet, two diaphragm units, the diaphragms of which are air-tight fastened along the periphery in the body from the inlet and outlet sides (the book "Liquid-Propellant Rocket Engine Design and Engineering," edited by G. G. Gakhun, Moscow, Mashinostroenie, 1989, p. 75, FIG. 4.5). In this known ampoule design diaphragm units with rupturable diaphragms are used.

In this technical solution, a diaphragm is broken under the effect of medium pressure, and bending the diaphragm (opening the flow section) is carried out due to the pressure drop thereon that is defined, in particular, by the flow rate of the liquid. If the liquid flow rate and, accordingly, the pressure drop on the diaphragm are low, then the diaphragm may first break only partially and then may bend to an arbitrary extent.

In view of the fact that after the diaphragm breaks, it or its parts occupy an indefinite and unstable position at different flow rates, such a design does not ensure stable hydraulic characteristics.

This is especially important when the ampoules are mounted in parallel main lines of a multi-chamber LRE, where it is necessary to ensure a strictly identical distribution of flow rates along those main lines after the break of diaphragms.

SUMMARY OF THE INVENTION

The object of the invention is to create an ampoule with starting fuel which does not have the aforesaid disadvantages and ensures enhancement of the quality of feeding the starting fuel.

An object of the invention is also to create an ampoule with starting fuel which ensures air-tightness in respect of the environment during the process of filling it with starting fuel.

The engineering result obtained by use of the proposed invention consists of ensuring reliable and uniform breaking of the diaphragm along the perimeter without its detachment or misalignment by the flow of liquid and ensuring stable hydraulic characteristics for the flow part of the ampoule after the break of the diaphragms by high pressure of the medium, but with a low flow rate.

The aforesaid result is achieved in an ampoule with starting fuel for igniting the propellant components of an LRE, the ampoule comprising a cylindrical body having an inlet from one side and an outlet from another side, two diaphragm units mounted inside the body from the sides of the inlet and outlet, wherein each of the diaphragm units includes a diaphragm, fixed in an air-tight manner along the periphery to the body with the possibility of the diaphragm being broken by the working medium, in that in accordance with the invention, it comprises means for filling the body with the starting fuel, and each of the diaphragm units comprises a piston, provided with a stem, and a guide bush with attachment means, wherein a diaphragm in each diaphragm unit is made in the form of a ring bridge, the piston is connected to the diaphragm, the piston stem is mounted in the guide bush with the possibility for the piston to move in a longitudinal direction.

Wherewith the guide bush is preferably mounted coaxially to the body and is fixed in the body with the aid of ribs.

Furthermore, it is preferable that the means for filling the body with the starting fuel be made from two blank flanges—filling and draining, which are mounted in a partition located perpendicular to the longitudinal axis of the body between the diaphragm units in ducts, respectively, filling and draining, which are made in the partition and communicate with the external surface of the body, each blank flange being made in the form of a threaded plug in which a hole is made for communication of the duct with the internal space of the body and a sealing plug provided with a sealing gasket, wherein the sealing plug is mounted in the duct and provided with a nut for fixing it.

In one of the embodiments, a spring lock is mounted inside the guide bush, and a ring groove is made on the stem with the possibility of placing the spring lock therein during movement of the piston.

Furthermore the stem may be made hollow, wherein its space communicating with the internal space of the body from the face of the stem opposite to the piston, and holes that are located at the piston base connected to the stem are made in the stem wall.

And also the thickness of a diaphragm in the place of its connection to the piston is preferably made less than the thickness of the diaphragm in the place of its connection to the body.

BRIEF DESCRIPTION OF THE DRAWINGS

FIG. 1 shows a longitudinal cross-sectional view of an ampoule;

FIG. 2 shows a cross-sectional view taken along lines 2 in FIG. 1, made through the filling (draining) blank flange;

FIG. 3 is an enlarged view of sections of FIG. 1 and illustrates the diaphragm and piston in further detail.

DESCRIPTION OF THE PREFERRED EMBODIMENT

An ampoule comprises a body 1 with an inlet 2 and an outlet 3, diaphragm units 4 and 5 mounted inside the body 1, and a means 6 for filling the body 1 with starting fuel. The diaphragm units 4 and 5 are essentially the same and have the same number identifiers, with the numerals of different diaphragm units 4,5 being distinguished by a "'". Each diaphragm unit 4,5 comprises a piston 7,7' which is integral with a diaphragm 8,8' respectively. The piston 7,7' is mounted in a guide element 9,9' of the body 1 with a slide fit. A peripheral part of the diaphragm 8,8' is fixed in an airtight manner to the body 1, e.g., by welding. The piston 7,7' is provided with a stem 10,10' which may be made cylindrical or in any other form and is received in a guide bush 11,11'. The guide bush 11,11', by means of ribs 12,12', is secured to the body 1 of the ampoule. The diaphragm units 4 and 5 are essentially the same but extend in opposite directions, and use the same reference numerals but are distinguished by a "'". Diaphragm units 4,5 have their stems 10,10' directed towards the outlet 3 of the body 1. The diaphragm units 4,5, also each comprise a spring lock adapted to fix the stem 10,10' after the diaphragm unit 4,5 is activated. The spring lock includes a spring ring 13, 13' received in an annular recess 14,14' made in the guide bush 11,11', and an annular recess 15,15' made on the external surface of the stem 10,10'. After the diaphragm unit 4,5 is activated, the spring lock 13,13' limits movement of the stem 10,10'. The stem 10,10' is provided with holes 16,16' to blow off gas out of the inner space of the stem 10,10' during the filling of the ampoule. The diaphragm 8,8' is made thin in the form of a ring bridge that may be broken during interaction with the working medium within a section D. Where the diaphragm 8,8' is connected to the piston 7,7', the former is made of a smaller thickness in order to exclude scratches when the piston 7,7' moves in the guide element 9,9' of the body 1.

The ampoule comprises means 6 for filling the body 1 with starting fuel, the means 6 being mounted in the partition 17 of the body 1 and including two blank flanges, a filling blank flange 18 and a draining blank flange 19. The blank flanges 18, 19 are mounted in filling and draining ducts 20 and 21, respectively. Each of the blank flanges 18, 19 has a threaded plug 22,22', a sealing plug 23,23' a sealing gasket 24,24' and a nut 25,25'. The threaded plug 22,22' has a flow rate hole 26,26'. For simplicity, the remaining sections of this specification refer to components having first and second reference numbers (e.g., diaphragm 8, 8') with the primary reference number (e.g., diaphragm 8).

Filling the ampoule with the starting fuel is carried out in the following manner. The threaded plugs 22 are screwed onto the assembled ampoule before the nuts 25 and sealing plugs 23 are mounted, but not as far as possible, in such a manner that opening the flow section of the filling 20 and draining 21 ducts through the hole 26 is ensured. The ampoule is filled with the starting propellant, feeding it through the filling duct 20 into the internal space of body 1 between the diaphragm units 4 and 5, and then through the draining duct 21 for draining. After the process of filling the ampoule is finished, the threaded plugs 22 are screwed as far as possible, after which the starting fuel is drained in front of the threaded plug 22 of the filling blank flange 18 and behind the threaded plug 22 of the draining blank flange 19. The sealing plugs 23, sealing gaskets 24 and nuts 25 are set in place. Now the ampoule is ready to be mounted on the rocket engine. It should be noted that a gas cushion is formed in the internal space of the ampoule in the body 1 between the diaphragms 8 as a result of assembling and filling the ampoule. The presence of a gas cushion promotes the assurance of ampoule reliability during its storage and promotes efficient movement of the piston 7 with acceleration when medium pressure is applied to the ampoule inlet 2.

The thickness of the diaphragm 8 in the place of its connection to the piston 7 is selected to be less than the thickness of the diaphragm 8 in the place of its connection to the body 1 with the formation of a ring bridge. In addition to excluding scratches, this makes it possible, when there is a break of the diaphragm 8, to ensure movement of the piston 7 over a distance A of the guide element 9 of the body 1 with acceleration due to an appropriate selection of a gap between the piston 7 and the guide element 9.

When a high-pressure components acts on the diaphragm unit 4 or 5 from the side of the inlet 2, deformation of the diaphragm 8 takes place with subsequent destruction along the circle D. If the destruction of the diaphragm 8 is not uniform and there is a manifestation of seal failure, the pressure before the piston 7 does not drop because of the presence of a throttling slot formed by the guide element 9 of the body 1 and by the piston 7, the piston 7 continues to move and after complete destruction of the diaphragm, the piston 7 accelerates. Accelerated movement of the piston 7 is ensured due to the presence of a force resulting from a drop of the pressure acting on the surface area defined by the diameter D. In the simplest interpretation, the acceleration is ensured according to the third law of mechanics and is equal to a force divided by the mass of moving parts.

The distance "A" over which the piston 7 moves with acceleration and the gap between the piston 7 and the guide element 9 of the body 1 are selected so as to ensure guaranteed cutting of the diaphragm 8 over the entire perimeter, the required delay in opening the flow section of the main line after the diaphragm 8 is cut, and acceleration of piston 7 which is necessary for actuation of spring lock 13. The dimensions of bridges of diaphragms 8 were determined by theoretical calculations, as a result of which pressure was established which ensured destruction of a bridge of a diaphragm 8. Thus, for example, with D=44mm and A=6 mm and the diaphragm 8 made from bronze alloyed with chromium, the axial dimension of the bridge of a diaphragm 8 is selected to be 0.3±0.02 mm, and the bridge destruction pressure is 50±10 kgf/cm$^2$.

Then, the stem 10 moving downstream the flow is fixed by the spring lock 13. The hydraulic characteristics of the open diaphragm unit 4 and/or 5 are reproduced with high accuracy, since structural elements having an indefinite location are not to be found in the component flow.

The proposed ampoule may be most successfully used in the main line of one of the propellant components at the inlet into the mixing head of the combustion chamber or gas generator for chemical ignition of the propellant components.

What is claimed is:

1. An ampoule with starting fuel for igniting propellant components of a Liquid-Propellant Rocket Engine, the ampoule comprising a cylindrical body having an inlet and an outlet;

a first diaphragm unit mounted inside the cylindrical body to a side of the inlet, the first diaphragm unit comprising a first piston having a first stem, and a first rupturable diaphragm integral with the first piston and attached with an air-tight weld along a periphery of the cylindrical body;

a second diaphragm unit mounted inside the cylindrial body to a side of the outlet, the second diaphragm unit comprising a second piston with a second stem, and a second rupturable diaphragm integral with the second piston and attached with an air-tight weld along a periphery of the cylindrical body;

a first guide bush coupled to a side of the cylindrical body, the first stem of the first diaphragm unit being received in the first guide bush;

a second guide bush coupled to a side of the cylindrical body, the second stem of the second diaphragm unit received in the second guide bush;

a first spring lock adapted to secure the first stem, comprising
  a first spring ring the first spring ring received in an annular recess of the first guide bush, and
  an annular recess of an external surface of the first stem configured to receive the first spring ring after the first diaphragm unit is activated;
a second spring lock adapted to secure the second stem, comprising
  a second spring ring received in an annular recess of the second guide bush, and
  an annular recess of an external surface of the second stem configured to receive the second spring ring after the second diaphragm unit is activated; and
a starting fuel source, wherein starting fuel provided by the starting fuel source fills an internal space of the cylindrical body between the first diaphragm unit and the second diaphragm unit.

2. The ampoule of claim 1, further comprising
a partition mounted perpendiculary to a longitudinal axis of a central part of the cylindrical body;
a filling duct formed in the partition, wherein an axis of the filling duct extends perpendicularly to the longitudinal axis of the cylindrical body; and
a draining duct formed in the partition, wherein an axis of the draining duct extends perpendicularly to the longitudinal axis of the cylindrical body.

3. The ampoule of claim 2, wherein the starting fuel source further comprises
a filling blank flange mounted in the filling duct; and
a draining blank flange mounted in the draining duct.

4. The ampoule of claim 3, wherein the filling blank flange further comprises a sealing plug.

5. The ampoule of claim 4, wherein the sealing plug of the filling blank flange further comprises
a sealing gasket;
a fixing nut; and
a threaded plug secured by the sealing gasket and the fixing nut, wherein the filling duct and an internal space of the cylindrical body are coupled with the threaded plug.

6. The ampoule of claim 3, wherein the draining blank flange further comprises a sealing plug.

7. The ampoule of claim 6, wherein the sealing plug of the draining blank flange further comprises
a sealing gasket;
a fixing nut; and
a threaded plug secured by the sealing gasket and the fixing nut, wherein the draining duct and an internal space of the cylindrical body are coupled with the threaded plug.

8. The ampoule of claim 1, wherein the first guide bush and the second guide bush are fixed to the cylindrical body with ribs.

9. The ampoule of claim 1, wherein the first and second stems of respective first and second diaphragm units are hollow, and wherein interior sections of the first and second stems are coupled to the cylindrical body interior from an end face of the first and second stems.

10. The ampoule of claim 1, wherein a thickness of a connection between the first and second diaphragms and the respective first and second pistons is smaller than a thickness of a connection between the first and second diaphragms and the cylindrical body.

11. An ampoule for supplying starting fuel for igniting propellant components of a Liquid-Propellant Rocket Engine, the ampoule comprising:

a cylindrical body having an inlet and an outlet;
a first diaphragm unit mounted inside the cylindrical body to a side of the inlet, the first diaphragm unit comprising
  a first piston having a first stem, and
  a first rupturable diaphragm integral with the first piston and attached with an air-tight weld along a periphery of the cylindrical body;
a second diaphragm unit mounted inside the cylindrical body to a side of the outlet, the second diaphragm unit comprising
  a second piston with a second stem, and
  a second rupturable diaphragm integral with the second piston and attached with an air-tight weld along a periphery of the cylindrical body; and
a chamber within the cylindrical body between the first and second diaphragm units, the chamber configured to receive the starting fuel.

12. The ampoule of claim 11, further comprising a first guide bush coupled to a side of the cylindrical body, the first stem of the first diaphragm unit being received in the first guide bush.

13. The ampoule of claim 12, wherein the first guide bush is fixed to the cylindrical body with ribs.

14. The ampoule of claim 12, further comprising a first spring lock adapted to secure the first stem, comprising
a first spring ring the first spring ring received in an annular recess of the first guide bush; and
an annular recess of an external surface of the first stem configured to receive the first spring ring after the first diaphragm unit is activated.

15. The ampoule of claim 12, further comprising a second guide bush coupled to a side of the cylindrical body, the second stem of the second diaphragm unit received in the second guide bush.

16. The ampoule of claim 15, wherein the second guide bush is fixed to the cylindrical body with ribs.

17. The ampoule of claim 16, further comprising a second spring lock adapted to secure the second stem, comprising
a second spring ring received in an annular recess of the second guide bush; and
an annular recess of an external surface of the second stem configured to receive the second spring ring after the second diaphragm unit is activated.

18. The ampoule of claim 11, wherein the first and second stems of respective first and second diaphragm units are hollow, and wherein interior sections of the first and second stems are coupled to the cylindrical body interior from an end face of the first and second stems.

19. The ampoule of claim 11, wherein a thickness of a connection between the first and second diaphragms and the respective first and second pistons is smaller than a thickness of a connection between the first and second diaphragms and the cylindrical body.

20. The ampoule of claim 11, wherein upon rupturing of the first and second diaphragm units, the first and second pistons are configured such that starting fuel is equally distributed around the locked first and second pistons.

21. The ampoule of claim 11, wherein the first and second stems are displaced in a direction of the output of the cylindrical body.

22. An ampoule for igniting propellant components of a Liquid-Propellant Rocket Engine, comprising
a cylindrical body having an inlet and an outlet;
a first diaphragm unit mounted to a side of the inlet inside the cylindrical body, the diaphragm unit comprising a first piston having a first stem, and
a first rupturable diaphragm coupled to the first piston;
a first guide bush coupled to a side of the cylindrical body, the first stem being received in the first guide bush;
wherein, upon rupturing of the first diaphragm, the first stem of the first piston moves within the first guide bush such that the first piston moves in a linear direction guided by the first guide bush;
a first spring lock coupled to the first stem, wherein the first spring lock comprises
a first spring ring received in a first annular recess of the first guide bush, and
a first annular recess of an external surface of the first stem,
the first annular recess being configured to receive the first spring ring after the first diaphragm ruptures, and when the first piston and the first piston stem are sufficiently displaced, the displacement driving the first spring ring into the first annular recess to lock the first piston;
a second diaphragm unit mounted to a side of the inlet inside the cylindrical body, the diaphragm unit comprising
a second piston having a second stem, and
a second rupturable diaphragm coupled to the second piston;
a second guide bush coupled to a side of the cylindrical body, the second stem being received in the second guide bush;
wherein, upon rupturing of the second diaphragm, the second stem of the second piston moves within the second guide bush such that the second piston moves in a linear direction guided by the second guide bush;
a second spring lock coupled to the second stem, wherein the second spring lock comprises
a second spring ring received in a second annular recess of the second guide bush, and
a second annular recess of an external surface of the second stem,
the second annular recess being configured to receive the second spring ring after the second diaphragm ruptures, and when the second piston and the second piston stem are sufficiently displaced, the displacement driving the second spring ring into the second annular recess to lock the second piston.

23. The ampoule of claim 22, further comprising a chamber within the cylindrical body between the first and second diaphragm units, the chamber configured to receive the starting fuel.

24. The ampoule of claim 23, further comprising a starting fuel source configured to provide starting fuel to the ampoule through the chamber.

25. An ampoule for igniting propellant components of a Liquid-Propellant Rocket Engine, comprising
a cylindrical body having an inlet and an outlet;
a diaphragm unit mounted to a side of the inlet inside the cylindrical body with an air-tight weld, the diaphragm unit comprising
a piston having a stem, and
a rupturable diaphragm coupled to the piston;
a guide bush coupled to a side of the cylindrical body, the stem being received in the guide bush;
wherein, upon rupturing of the diaphragm, the stem of the piston moves within the guide bush such that the piston moves in a linear direction guided by the guide bush.

26. The ampoule of claim 25, further comprising a spring lock coupled to the stem, wherein the spring lock comprises
a spring ring received in an annular recess of the guide bush, and
an annular recess of an external surface of the stem, wherein the annular recess is configured to receive the spring ring after the diaphragm ruptures and the piston is sufficiently displaced, wherein the stem of the piston is displaced within the guide bush activates movement of the spring ring into the annular recess.

27. The ampoule of claim 25, wherein the annular recess is configured to receive the first spring ring, and wherein movement of the piston is limited by possible movement of the spring ring within the annular recess.

28. The ampoule of claim 27, wherein the starting fuel is distributed equally distributed around the locked piston.

29. The ampoule of claim 26, wherein the stem is displaced in a direction of the output of the cylindrical body.

* * * * *

UNITED STATES PATENT AND TRADEMARK OFFICE
CERTIFICATE OF CORRECTION

PATENT NO. : 6,324,832 B1
DATED : December 4, 2001
INVENTOR(S) : Jury Jurievich Ivanov et al.

It is certified that error appears in the above-identified patent and that said Letters Patent is hereby corrected as shown below:

Title page,
Item [56], References Cited, U.S. PATENT DOCUMENTS,
Replace "4,312,954 * 1/1982 Black  ...   141/329"
with -- 4,321,954 * 1/1982 Black  ......  141/329 --

Column 4,
Line 55, replace "cylindrial" with -- cylindrical --.

Column 5,
Line 3, after "a first spring ring" delete "the first spring ring".

Column 6,
Line 27, after "a first spring ring" delete "the first spring ring".

Column 8,
Line 33, before "displaced" delete "is".
Line 40, before "equally" delete "distributed".

Signed and Sealed this

Fifth Day of November, 2002

Attest:

Attesting Officer

JAMES E. ROGAN
*Director of the United States Patent and Trademark Office*